(12) United States Patent
Burkholder et al.

(10) Patent No.: US 8,745,990 B2
(45) Date of Patent: Jun. 10, 2014

(54) GAS TURBINE ENGINE WITH INTEGRATED ELECTRIC STARTER/GENERATOR

(75) Inventors: Philip Burkholder, Pittsboro, IN (US); Rigoberto J. Rodriguez, Avon, IN (US); Steven Gagne, Avon, IN (US); Kenneth M. Pesyna, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 991 days.

(21) Appl. No.: 12/694,786

(22) Filed: Jan. 27, 2010

(65) Prior Publication Data

US 2010/0127496 A1 May 27, 2010

Related U.S. Application Data

(63) Continuation-in-part of application No. 12/509,887, filed on Jul. 27, 2009, now abandoned.

(51) Int. Cl.
F02N 11/04 (2006.01)

(52) U.S. Cl.
USPC .................... 60/788; 60/786; 290/47; 290/52

(58) Field of Classification Search
USPC ........ 60/786, 787, 788; 244/53 A; 290/47, 52
See application file for complete search history.

(56) References Cited

U.S. PATENT DOCUMENTS

| | | | | |
|---|---|---|---|---|
| 2,405,164 A | * | 8/1946 | Pavlecka | 415/135 |
| 2,965,809 A | * | 12/1960 | Edsall | 361/31 |
| 3,264,482 A | | 8/1966 | Clark et al. | |
| 3,624,471 A | * | 11/1971 | Japp et al. | 318/771 |
| 4,088,422 A | | 5/1978 | Martin | |
| 4,253,031 A | * | 2/1981 | Frister | 290/52 |
| 4,371,817 A | * | 2/1983 | Muller | 318/400.41 |
| 5,237,817 A | * | 8/1993 | Bornemisza et al. | 60/226.1 |
| 5,363,641 A | | 11/1994 | Dixon et al. | |
| 5,555,722 A | | 9/1996 | Mehr-Ayin et al. | |
| 5,575,147 A | * | 11/1996 | Nikkanen | 60/226.2 |
| 5,607,329 A | * | 3/1997 | Cho et al. | 440/6 |
| 6,042,336 A | * | 3/2000 | Bulgrin et al. | 416/145 |
| 6,267,553 B1 | * | 7/2001 | Burge | 415/115 |
| 6,393,355 B1 | | 5/2002 | Muramatsu | |
| 6,434,473 B1 | | 8/2002 | Hattori | |

(Continued)

FOREIGN PATENT DOCUMENTS

FR 2779584 12/1999
FR 2779584 A1 12/1999

(Continued)

OTHER PUBLICATIONS

The Jet Engine—the future, The Jet Engine, 6th edition 2005, section 2.6, p. 277, ISBN: 0 902121 2 35, Rolls-Royce PLC, London, England.

*Primary Examiner* — William H Rodriguez
*Assistant Examiner* — Lorne Meade
(74) *Attorney, Agent, or Firm* — McCormick, Paulding & Huber LLP (57) ABSTRACT

An electrical machine is embedded into the compressor assembly of a gas turbine engine. An electrical system interface module distributes electrical current to and from the embedded electrical machine for starting the gas turbine engine and for operating accessory components. Accordingly, the gas turbine engine and accessory components can be started and operated without a power-takeoff shaftline and without an external accessory gearbox.

10 Claims, 8 Drawing Sheets

(56) References Cited

U.S. PATENT DOCUMENTS

| | | | |
|---|---|---|---|
| 6,914,344 B2 * | 7/2005 | Franchet et al. | 290/52 |
| 7,237,382 B2 | 7/2007 | Muramatsu et al. | |
| 7,246,495 B2 | 7/2007 | Muramatsu et al. | |
| 7,973,421 B2 * | 7/2011 | Sharp | 290/52 |
| 2007/0157597 A1 * | 7/2007 | Sharp | 60/226.1 |
| 2010/0133813 A1 * | 6/2010 | Cote et al. | 290/32 |
| 2011/0018273 A1 | 1/2011 | Burkholder et al. | |

FOREIGN PATENT DOCUMENTS

| | | |
|---|---|---|
| GB | 1147730 | 4/1969 |
| GB | 1147730 A | 4/1969 |
| GB | 1174969 | 12/1969 |
| GB | 1174969 A | 12/1969 |

* cited by examiner

GAS TURBINE ENGINE WITH INTEGRATED ELECTRIC STARTER/GENERATOR

CROSS REFERENCE TO RELATED APPLICATIONS

This application is a continuation-in-part of, claims priority to, and hereby incorporates herein by reference in its entirety, U.S. patent application Ser. No. 12/509,887, filed on Jul. 27, 2009, now abandoned.

FIELD OF THE INVENTION

The present invention relates generally to gas turbine engines, and more particularly to a gas turbine engine including an electric starter/generator integrated into a compressor rotor and casing of the gas turbine engine.

BACKGROUND OF THE INVENTION

Figure 1:
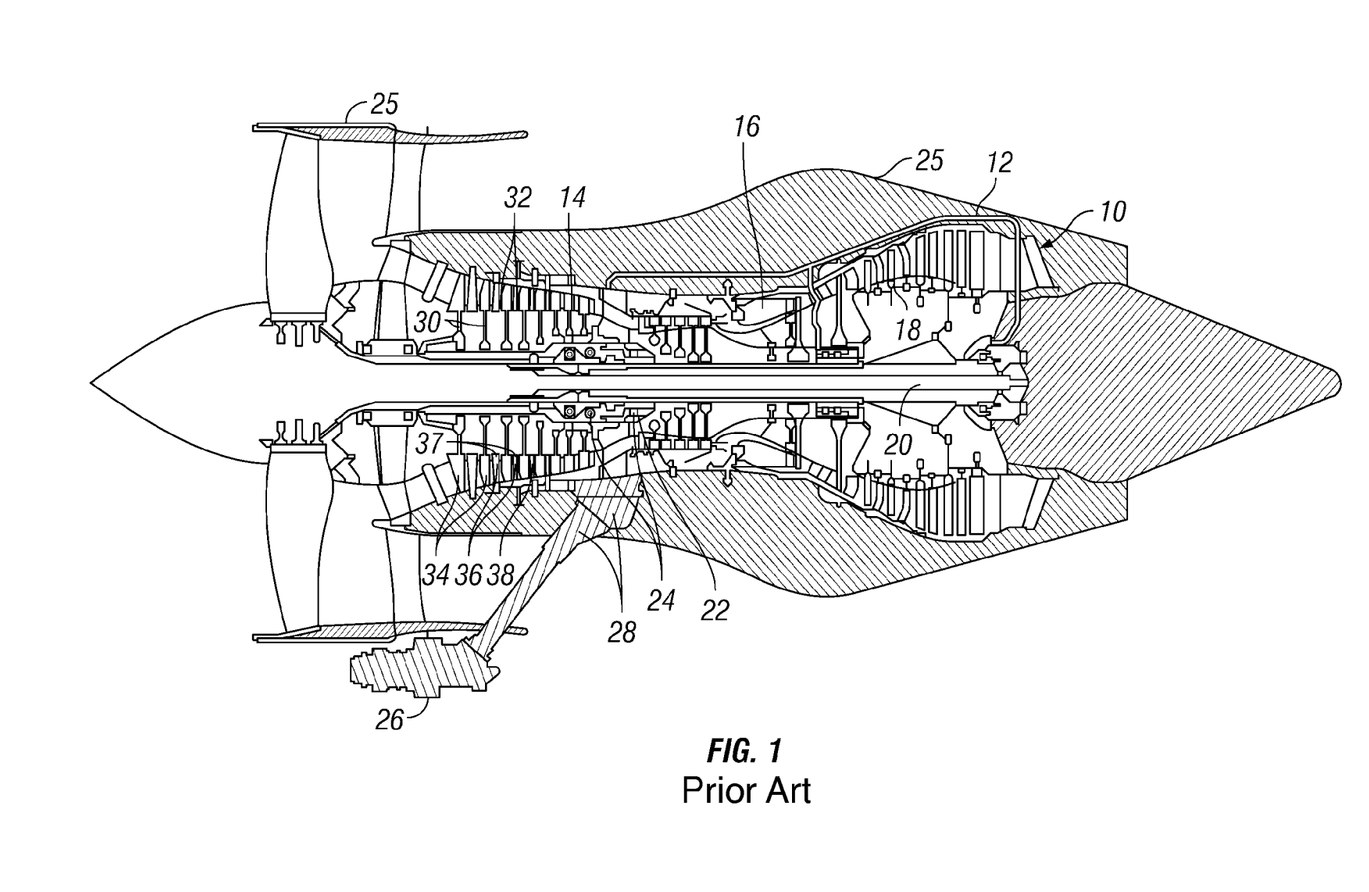
FIG. 1 is a side sectional view of a gas turbine engine indicating conventional components including an accessory gearbox.

Referring to FIG. 1, a typical gas turbine engine 10 includes an engine casing 12 that houses a compressor rotor 14, a combustor 16, a turbine rotor 18, and a shaft 20 connecting the compressor rotor to the turbine rotor. The shaft is rotatably mounted to the casing by way of an internal gearbox 22 and bearings 24 disposed between the compressor rotor and the turbine rotor. The compressor rotor and the turbine rotor rotate with the shaft. The gas turbine engine is mounted within a nacelle 25. The gas turbine engine also includes various accessory components that receive mechanical power from an accessory gearbox 26 that is mounted external to the engine casing. The accessory gearbox receives mechanical power from the gas turbine engine shaft via a power-takeoff shaftline 28 that extends radially outward from the internal gearbox through the gas turbine engine casing, substantially as disclosed, for example, in U.S. Pat. No. 7,246,495 issued to Muramutsu et al.

The compressor rotor 14 includes an axially-spaced plurality of compressor discs 30 mounted to the shaft and separated by interstage spacers 32 also mounted to the shaft. The compressor rotor discs and the interstage spacers together form the compressor rotor. Each compressor disc supports a circumferential array of compressor blades 34, while each interstage spacer supports a series of labyrinth seal teeth. The design of the compressor as a whole is driven by working fluid requirements of the gas turbine engine thermodynamic cycle. Additionally, the compressor rotor assembly is optimized for weight reduction, key dimensions of the discs and the blades being manufactured to approximately 0.0001" tolerances in order to have just enough material to support centripetal strains induced when the rotor rotates at operational speeds under operational temperatures. Extensive efforts are made to eliminate stress risers such as holes, corners, or sharp indentations in the surface or the cross-section of the compressor disc and of each compressor blade. Special effort is given to optimizing the blade root region, where each compressor blade is mounted to a compressor disc. Special materials also are chosen for use in the compressor rotor. Typically, titanium is preferred for its strength and toughness at elevated temperatures. The turbine rotor 18 is similarly constructed.

Adjacent to the compressor rotor, the gas turbine engine casing supports a plurality of compressor vane assemblies 36 that are axially interspaced with the circumferential arrays of compressor blades. Each compressor vane assembly includes a circumferential array of vanes 37 that extend inward from the casing to a shroud ring 38 that is closely radially adjacent to a corresponding interstage spacer of the compressor rotor. Typically, each vane is pivotable around a shaft extending radially from the casing to the shroud ring, and each circumferential array of vanes is synchronously movable by a control ring mounted outside the gas turbine engine casing. Vane dimensions are optimized for aerodynamic performance (low flow resistance) and for maximal variability of flow area as the vanes are rotated. The turbine portion of the casing is similarly constructed.

Figure 2:
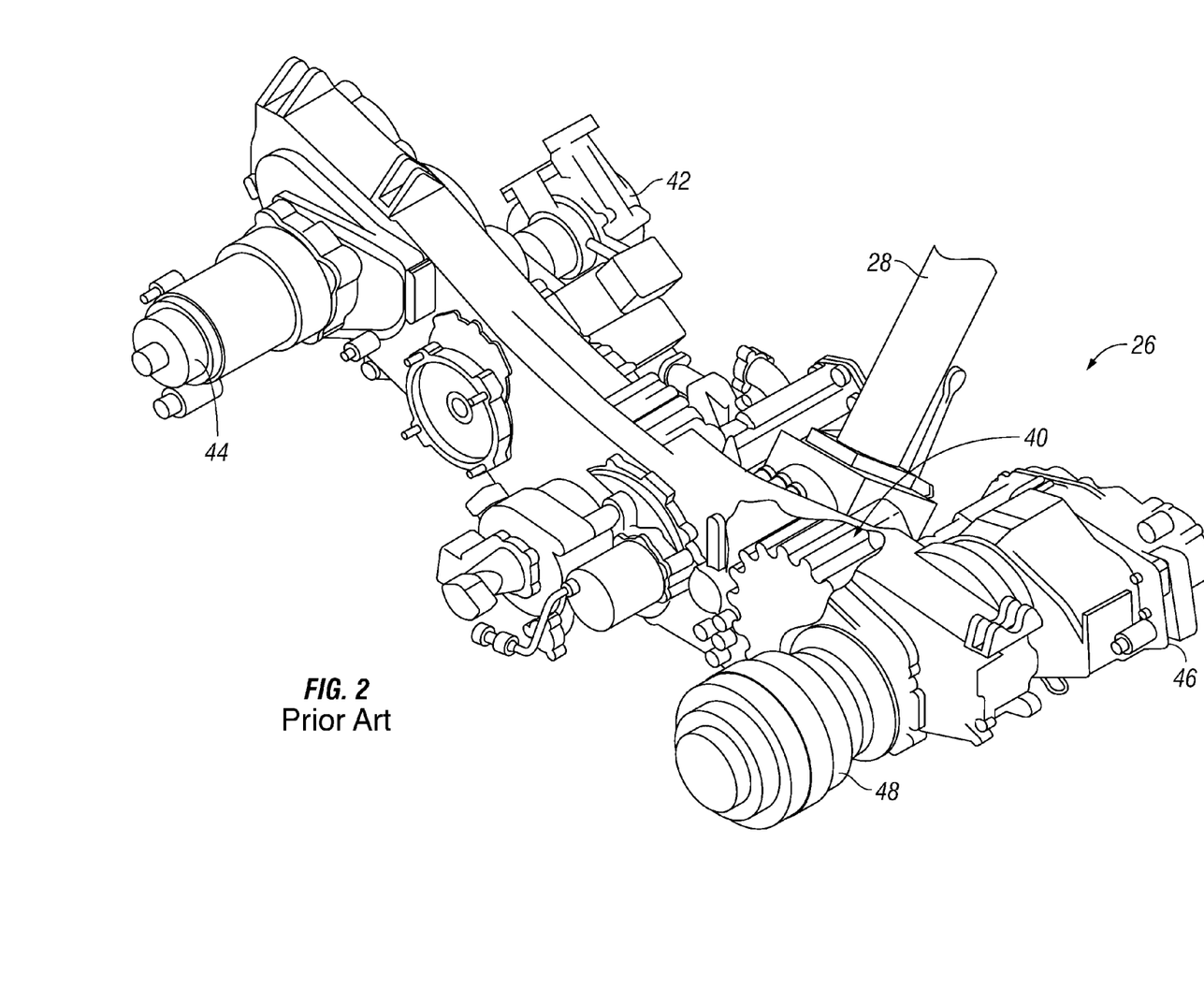
FIG. 2 is a perspective partial cutaway view of the accessory gearbox shown in FIG. 1.

Referring to FIG. 2, the accessory gearbox 26 houses an accessory geartrain 40 for driving the accessory components. The accessory components include, for example, a fuel pump 42, an oil pump 44, and an alternator or generator 46. Each accessory component is mounted directly to the accessory gearbox and is driven from a corresponding gear within the accessory geartrain. The accessory gearbox also supports an engine starter 48, which can be pneumatic, hydraulic, electrical, or combustion-driven. The engine starter is clutch-connected to the accessory geartrain so that the engine starter will not place an unnecessary load on the accessory geartrain during operation of the gas turbine engine 10. Optionally, the engine starter can be integrated into the accessory gearbox, as disclosed, for example, by U.S. Pat. No. 5,555,722 issued to Mehr-Ayin et al.

During engine startup, the engine starter drives the power-takeoff shaftline 28, via the accessory geartrain, in order to turn the shaft 20 of the gas turbine engine 10. Thus, the typical accessory gearbox transfers power from the power-takeoff shaftline to the accessory components during operation, and provides power to the power-takeoff shaftline from the engine starter at startup. For weight reduction, the engine starter can be integrated with the generator to provide a combined starter/generator.

Figure 3:
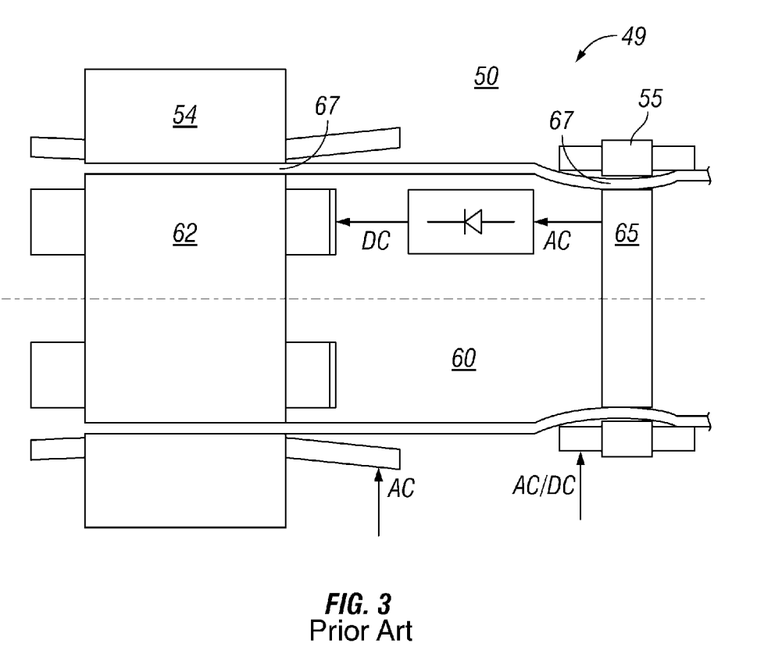
FIG. 3 is a schematic sectional view of a typical starter/generator usable with the gas turbine engine shown in FIG. 1.

Referring to FIG. 3, a typical combined starter/generator 49 includes a stator 50 housing primary windings 54 and exciter field windings 55, and also includes a rotor 60 housing rotor windings 62 and exciter windings 65 that are electrically connected with the primary field windings. As will be apparent to those of ordinary skill, the rotor is housed within the stator for rotation about an axis of the stator, and the different windings of the starter/generator can be selectively energized for operation as a starter (motor) or as a generator.

For operation of the combined starter/generator 49 as a generator, the exciter field windings 55 are energized to produce a (typically stationary) exciting magnetic field, and tangential motion of the exciter windings 65 across the exciting field induces electrical current in the exciter windings and in the rotor windings 62. In turn, tangential movement of the rotor windings across the primary windings 54 induces electrical currents in the primary windings. For operation as an asynchronous starter motor, the primary windings are energized to produce a rotating magnetic field, which electromechanically couples with the rotor windings to cause rotation of the rotor. For optimal performance of the combined starter/generator, the electromagnetic gaps 67 between the rotor windings and the primary windings, and between the exciter field windings and the exciter windings, are kept as small as possible. Typically, the rotor windings 62 and the exciter windings 65 are at the circumference of the rotor 60 and are separated from the primary windings 55 by only a narrow (<0.2 inch) air gap to allow for thermal and mechanical strains at operating speed and temperatures.

Since the starting torque for the gas turbine engine 10 is significantly larger than the torque required by any other mechanical load on the accessory geartrain 40, the gas turbine engine starting torque determines the sizes and weights of the internal gearbox 22, the power-takeoff shaftline 28, the accessory geartrain 40, and the starter 48. As can be seen from FIG.

1, the size and placement of the internal gearbox affect the overall axial and radial size of the gas turbine engine and of the gas turbine engine nacelle 25. Additionally, for gas turbine engines mounted on aircraft, the power-takeoff shaftline and the accessory gearbox 26 introduce structural asymmetries that can adversely impact the aerodynamic performance of the gas turbine engine nacelle. Thus, mechanical transfer of power to and from the gas turbine engine shaft, via the radial power-takeoff shaftline and the accessory geartrain, plays an undesirably important role at many stages of gas turbine engine design.

Accordingly, efforts have been made toward developing a more electric engine. For example, it has been proposed to incorporate an electric starter/generator machine into a shaftline of a gas turbine engine, in place of an internal gearbox. However, one-for-one replacement of the gearbox with the electric machine has proven challenging. Structural requirements and temperature limitations have limited implementation of the more electric engine concept. In particular, materials typically used in generators are excessively heavy, do not provide adequate mechanical strength, and/or present unacceptable dimensional variations at the operating temperatures and rotational speeds typically achieved within a gas turbine engine. Typical engine temperatures range from about 1300 F (for high-pressure cooling air) up to about 2800 F (at the combustor exhaust). By contrast, common electrical machine winding materials such as aluminum or copper liquefy at 1220 F or 1984 F, respectively. These materials also exhibit significant thermal strains throughout the operating temperature range of a typical gas turbine engine. Although permanent magnets can be arranged to provide satisfactory electromagnetic coupling with less weight, typical permanent magnet materials such as neodymium iron boron exhibit structural instability due to thermal fatigue, and also exhibit rapid demagnetization above the materials' respective Curie temperatures. Curie rapid temperatures for typical permanent magnet materials range from 590 F up to about 680 F, while long-term operating temperatures do not exceed 400 F.

Alternatively to replacing the internal gearbox, an electric machine can be integrated into fan casing struts and a fan rotor of a gas turbofan engine, as taught by Sharp in U.S. PG Pub. 20070157597, now abandoned. However, fan rotors preferably are designed to be as thin and light as possible for enhanced aerodynamic performance, so that the added weight and volume required for generator windings is not desirable in a fan of a gas turbofan engine. Additionally, fan rotor rotational speeds are limited by aerodynamic considerations such as angle-of-attack and drag, while it is desirable for a starter/generator to move at a rotational speed determined by electrical bus requirements.

SUMMARY OF THE INVENTION

With the foregoing problems and concerns in mind, an object of the present invention is to provide engine starting and power takeoff equipment without requiring an accessory gearbox or a power-takeoff shaft. Another object of the present invention is to provide engine starting and power takeoff equipment in a smaller volume and with less total mass than can be achieved by conventional gas turbine engine designs.

According to the present invention, a gas turbine engine includes an electrical starter/generator machine that is integrated into a compressor of the gas turbine engine.

According to a first embodiment of the present invention, a gas turbine engine has a casing, a shaft rotatably mounted in the casing, and a compressor rotor and a turbine rotor mounted to the shaft within the casing, with a field magnet mounted in the compressor rotor, and a circumferential array of conductive coils mounted in the casing substantially adjacent to a circle defined by revolution of the field magnet within the casing. An electrical system interface module is electrically connected to the circumferential array of conductive coils.

In one aspect of the present invention, a compressor blade disc of a gas turbine engine includes a circumferential array of magnets and a compressor vane shroud of the gas turbine engine includes a corresponding circumferential array of conductive coils disposed adjacent to the magnets to form an axial-flux electric starter/generator machine for transfer of power to and from the compressor rotor during starting and operation of the gas turbine engine. In another aspect of the present invention, an interstage spacer of a compressor rotor in a gas turbine engine includes a circumferential array of magnets and a compressor vane shroud of the gas turbine engine includes a corresponding circumferential array of conductive coils disposed adjacent to the magnets to form a radial-flux electric starter/generator machine for transfer of power to and from the compressor rotor during starting and operation of the gas turbine engine.

In a further aspect of the present invention, the electrical system interface module includes a starter module for providing electrical current to the conductive coils, a power-takeoff module for receiving current from the conductive coils, and a control module for actuating one of the starter module and the power-takeoff module based on at least a command signal. The starter module of the electrical system interface module can be configured to provide three-phase alternating current across the conductive coils for operating the gas turbine engine as a motor. Alternatively, the starter module can be configured to provide pulsed DC current. The power-takeoff module of the electrical system interface module can be configured to receive three-phase alternating current from the conductive coils for operating the gas turbine engine as an electrical generator. Alternatively, the power-takeoff module can be configured to receive and commute pulsed DC current.

According to a second embodiment of the present invention, a shaft is rotated within a casing of a gas turbine engine by applying a current through an array of conductive coils housed in the casing adjacent to one or more magnets mounted in a compressor rotor fixed to the shaft.

DETAILED DESCRIPTION OF THE PREFERRED EMBODIMENTS

Figure 4:
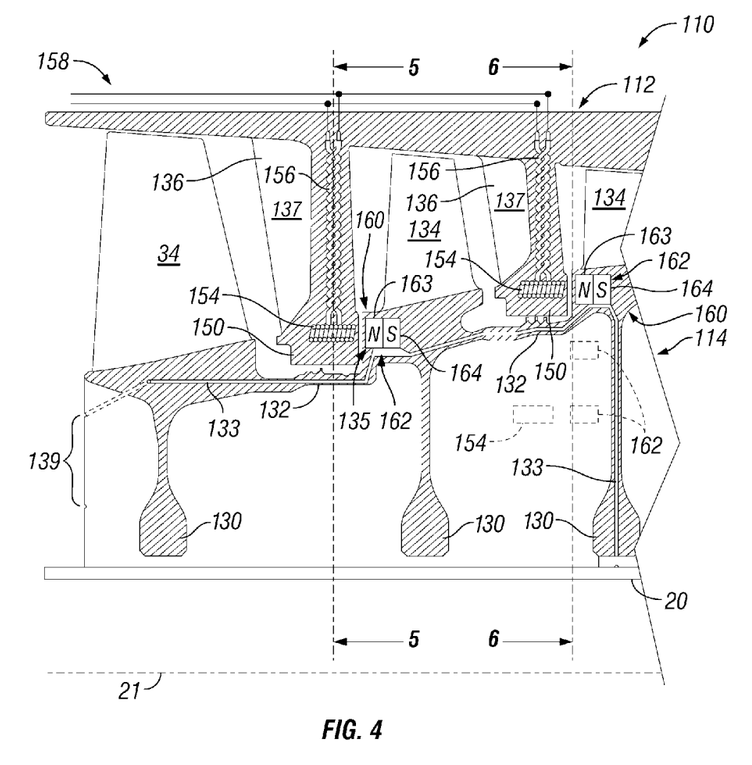
FIG. 4 is a side sectional view of a portion of a gas turbine engine compressor including an axial-flux starter/generator machine, according to a first embodiment of the present invention.
Figure 5:
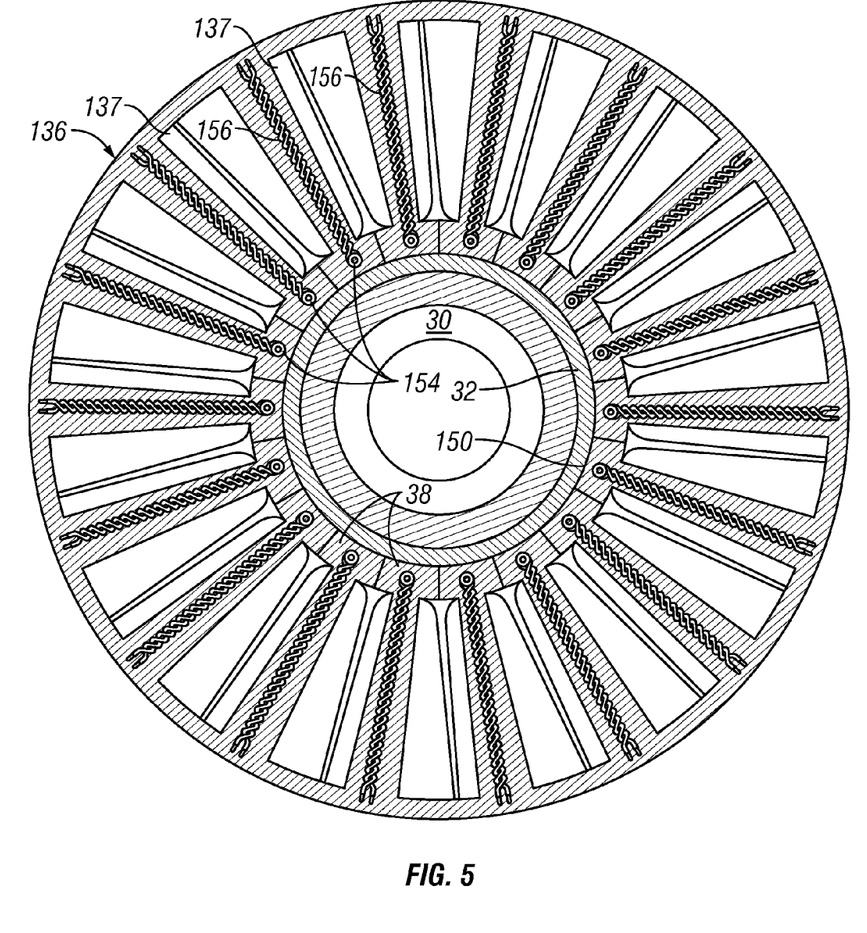
FIG. 5 is an axial sectional view of the gas turbine engine shown in FIG. 4, taken through a plane 5-5 to show conductive coils and power leads in a power-transfer ring of the axial-flux starter/generator machine.

Referring to FIG. 4, wherein similar numbers indicate components similar to the known components described with reference to FIG. 1, according to an embodiment of the present invention a gas turbine engine 110 has a casing 112 that includes a plurality of compressor vane assemblies, and also includes a compressor rotor 114 that is built from a plurality of compressor discs and interstage spacers. At least one of the compressor vane assemblies is a power-transfer vane assembly 136, having stationary vanes 137 that support an axial power-transfer ring 150. The axial power-transfer ring houses at least one conductive coil 154 oriented with a central axis of the coil winding extending generally axially, or parallel to the shaft of the gas turbine engine, so as to form an axial flux device. The coil can be helically wrapped, or can be a planar winding. Preferably, the power-transfer shroud ring houses a circumferential array of conductive coils, as shown in FIG. 5. The one or more conductive coils are connected by one or more power leads 156 extending through the stationary vanes to power bus conductors 158 mounted on or in the casing of the gas turbine engine. Alternatively, power leads can be routed through the radial shafts of pivotable vanes.

Figure 6:
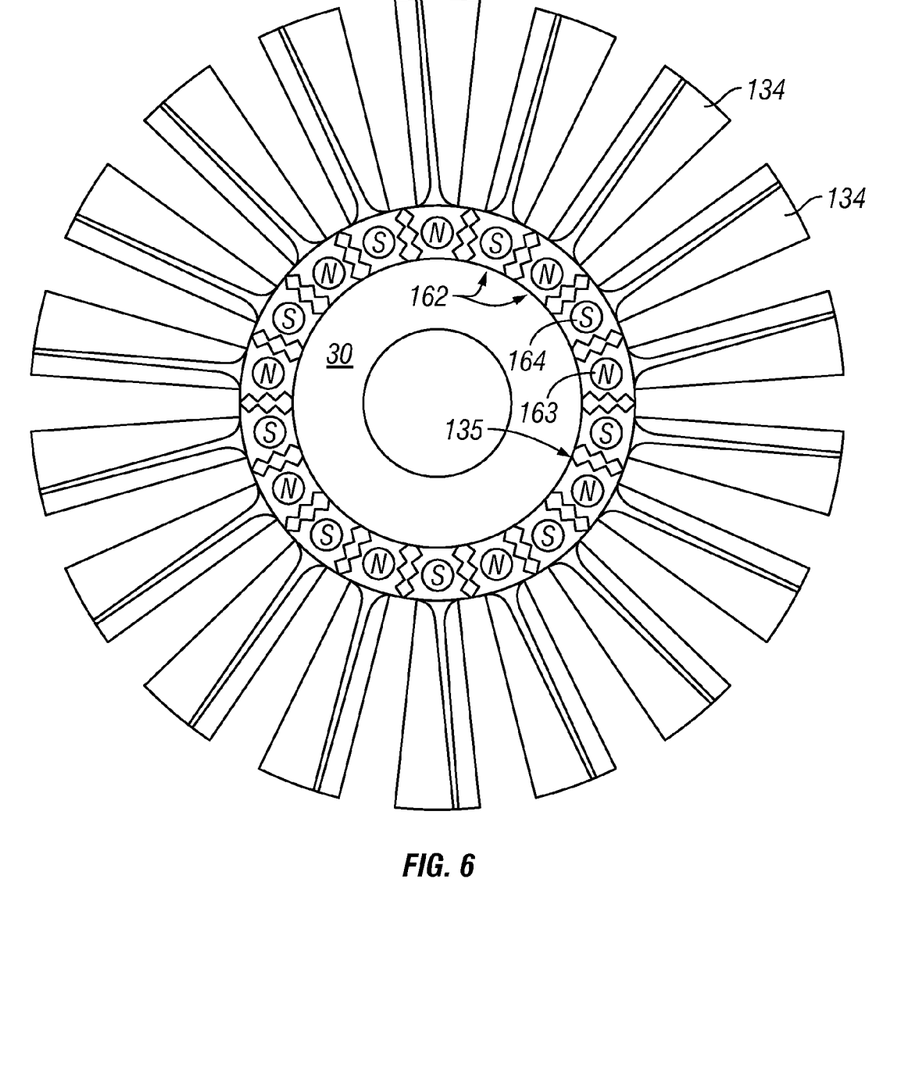
FIG. 6 is an axial sectional view of the gas turbine engine shown in FIG. 4, taken through a plane 6-6 to show permanent magnets in a field ring of the axial-flux starter/generator machine.

Referring to FIG. 6, at least one of the compressor discs is configured to include an axial field ring 160, which houses one or more magnets 162, substantially adjacent to the power-transfer ring. (By "substantially" adjacent, it is meant sufficiently adjacent to permit effective electromagnetic coupling between the magnet housed in the field ring and the coils housed in the power-transfer ring). Each of the magnet or magnets 162 is oriented and aligned with respect to the conductive coils such that the central axes of the coil windings 154 extend parallel to the lines of magnetic flux through a north pole 163 and a south pole 164 of the magnet.

In order to maintain radial strength of the compressor disc and blade assembly, the magnets may be disposed within roots of modified blades 134, as shown in FIG. 6. Alternatively, the magnets may be inserted between the blades into a modified blade root region 135 of the axial field ring. In order to enhance coupling of the magnets with the power-transfer windings 154, the surface of the axial field ring that faces the power-transfer ring 150 can be perforated adjacent to each magnet so as to reduce the electromagnetic gap between each magnet and the adjacent power-transfer winding, without diminishing radial clearance between the compressor rotor 114 and the casing 112. Additionally, the facing surfaces of the axial field ring and of the power-transfer ring can be made irregular to reduce induction of eddy currents during rotation of the compressor rotor 114.

In order to avoid demagnetization and thermal fatigue of the magnets 162, the compressor rotor 114 can include perforated discs 130 and perforated interstage spacers 132 circumferentially aligned to define peripheral passages 133 for providing coolant flow adjacent to the magnets. The coolant can be air from the intake of the gas turbine engine 110 or from an intermediate compressor stage that is forced through the peripheral passages from angled inlets 139. Alternatively, the coolant can be oil. Additionally, the material of the magnets can be selected to enhance high-temperature performance. For example, samarium cobalt magnets can be utilized to temperatures up to 660° F., well below the temperature of in an intermediate pressure compressor rotor.

The power-transfer ring 150 and the field ring 160 can be used as an electrical generator with just one coil 154 and one magnet 162. Preferably, a plurality of magnets are arranged around the field ring in a circumferential array similar to the circumferential array of conductive coils mounted on the power-transfer ring, both for improving performance of the generator and for enabling use of the power-transfer ring and the field ring as a motor to start the gas turbine engine. For example, the circumferential array of conductive coils 154 can be electrically connected to receive and to provide single-phase or three-phase alternating current from and to the bus conductors 158, and the circumferential array of magnets 162 can be arranged so that the field ring and power-transfer ring can be used as a permanent magnet motor/generator.

A three-phase alternating current configuration of the power leads 156 and the bus conductors 158 is preferred for efficiency, particularly in using the conductive coils as stator windings for starting the gas turbine engine 110. In three-phase configurations, the conductive coils can be wye- or delta-connected. Alternatively, the conductive coils can be electrically connected to receive and to provide pulsed direct current, and the magnet or magnets 162 can be arranged relative to the conductive coils so that the gas turbine engine can be used as a DC stepper motor/DC generator. Additionally, several power-transfer shroud rings 150 and corresponding field rings 160 can be arranged along the compressor assembly to produce a distributed electric machine extending along several compressor stages.

Figure 7:
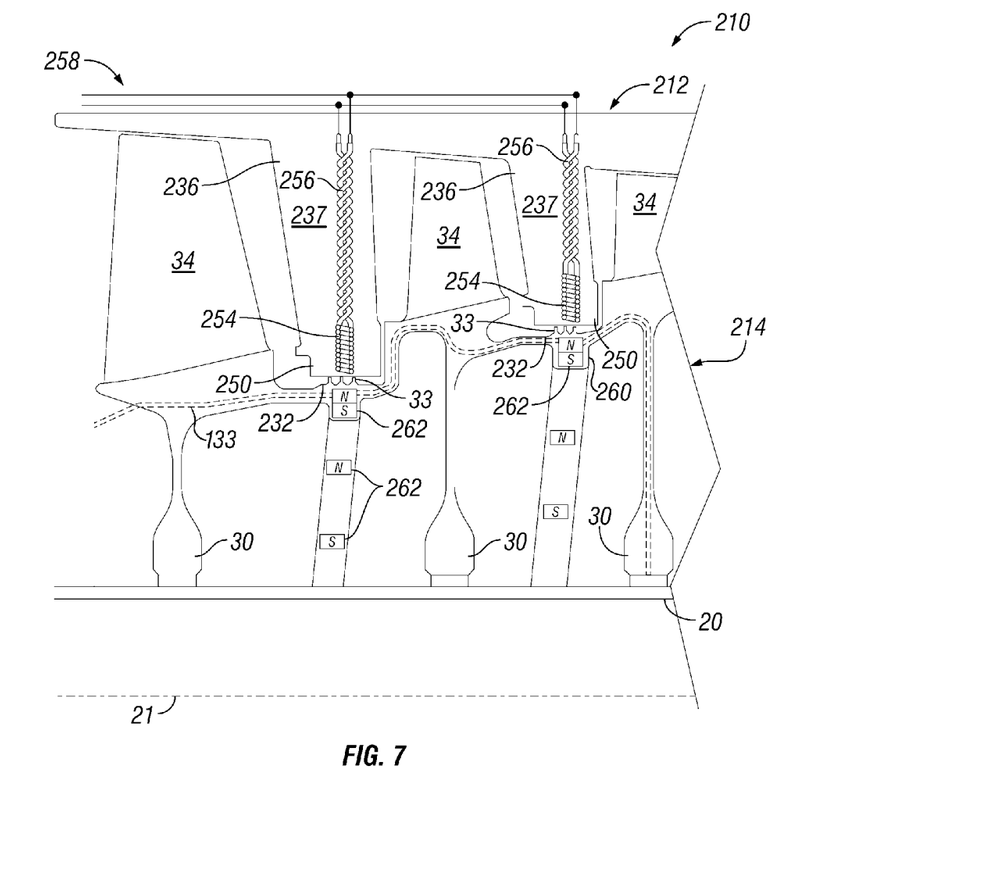
FIG. 7 is a side sectional view of a portion of a gas turbine engine compressor including a radial-flux starter/generator machine, according to a second embodiment of the present invention.

With reference to FIG. 7, wherein similar numbers indicate components similar to those described with reference to FIGS. 1 and 4, according to another embodiment of the present invention a gas turbine engine 210 includes a plurality of compressor vane assemblies including shroud rings, at least one of which is configured as a radial power-transfer shroud ring 250, and also includes a plurality of compressor discs and interstage spacers, at least one of the interstage spacers being configured as a modified interstage spacer 232 including a radial field ring 260 adjacent to the power-transfer ring.

The power-transfer ring houses a circumferential array of conductive coils or windings 254, which are connected by one or more power leads 256 to an electrical system interface module outside the casing of the gas turbine engine. The power leads can be housed within non-rotating compressor guide vanes 237, or alternatively can be threaded along rotational axes of conventional compressor guide vanes (not shown in FIG. 7). Each of the conductive coils is oriented such that a central axis through the coil extends in a direction generally radially, or perpendicular to the shaft of the gas turbine engine, so as to form a radial flux device. The field ring houses at least one magnet 262, which is oriented and aligned with respect to the coil such that the central axis of the coil extends through a north pole and a south pole of the magnet.

To enhance coupling between the magnets 262 and the radial power-transfer windings 254, the outer circumferential surface of the field ring can be perforated adjacent to each magnet. Additionally, by locating the magnets generally under the teeth of a labyrinth seal 33 disposed on the interstage spacer 232, coupling of the magnets to the windings can be further enhanced while induction of eddy currents can be reduced.

Figure 8:
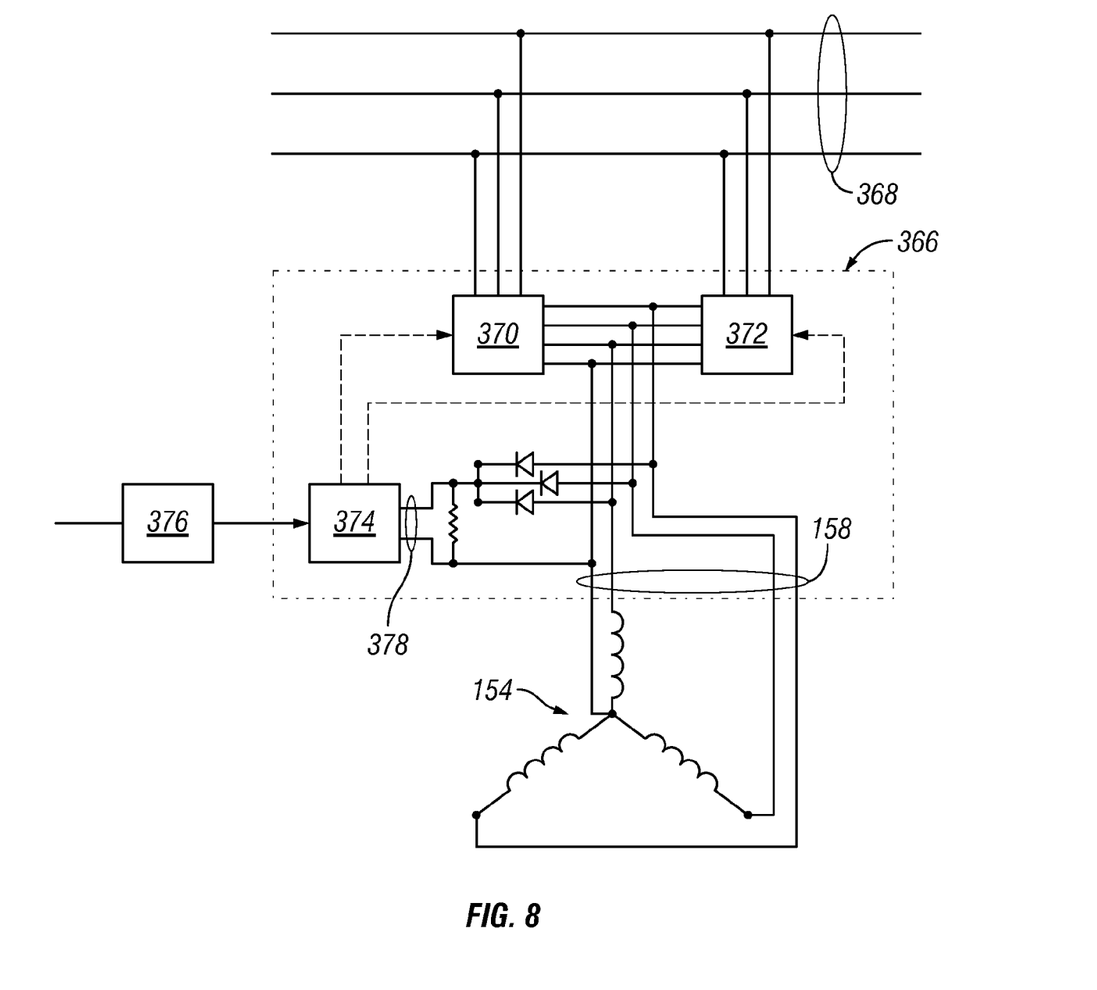
FIG. 8 is a schematic illustration of an electrical system interface module for use with either of the starter/generator machines shown in FIGS. 4-7, according to an embodiment of the present invention.

Referring to FIG. 8, an electrical system interface module 366 electrically connects the power bus conductors 158 or 258 to one or more external electrical systems 368. The electrical system interface module includes a starter module 370, a power-takeoff module 372, and a control module 374. The starter module is configured to receive direct current (DC) or alternating current (AC) from at least one of the one or more external electrical systems, and is configured to selectively provide DC or AC to the conductive coils 154 or 254. The power-takeoff module is configured to receive AC or pulsed DC from the circumferential array of conductive coils and to provide AC or DC to the one or more external electrical systems. In configurations where the power-takeoff module receives DC from the conductive coils, the power-takeoff module can be further configured to commute the DC from the conductive coils, for example electromechanically or by printed or wired solid-state electronics.

The control module is configured to selectively actuate the starter module and/or the power-takeoff module based on a command signal 376 and/or monitored conditions 378 (including, for example, voltages measured across the circumferential array of conductive coils 154 or 254). The starter module, the power-takeoff module, and the control module can be embodied in appropriately-selected single-phase or three-phase inverters, rectifiers, transformers, logic gates, power transistors, relays, switches, breakers, or equivalent solid-state or component-built circuits, devices, or software-configured processors, as will be apparent to those of ordinary skill in the arts of electrical power generation, control, and distribution.

In operation, the starter module 370 supplies electrical power to the conductive coils 154 or 254, via the bus conductors 158 or 258, for starting the gas turbine engine 110 or 210 according to the configuration of the conductive coils and of the one or more magnets 162 or 262. For example, the circumferential array of magnets mounted on the field ring and the circumferential array of coils mounted on the power-transfer ring can be configured for use as a DC stepper motor or other brushless DC motor, wherein the starter module provides pulsed DC to the conductive coils. DC stepper motors advantageously produce high torque at zero speed, a characteristic that is optimal for starting a gas turbine engine. Alternatively, the magnets and coils can be configured for use as a three-phase AC motor, which also can provide high starting torque.

Once the gas turbine engine has been started, the control module 374 isolates the starter module 370 and actuates the power-takeoff module 372 for providing electrical current from the conductive coils 154 or 254 to some or all of various accessory components, similar to the oil pump 42 and the fuel pump 44 shown in FIG. 2. Operation and reconfiguration of the electrical system interface module 366 can be accomplished by circuitry, by software, by manual intervention, or by a combination of hardware and/or software and/or manual intervention, as will be apparent to those of ordinary skill in the art of control systems.

Thus, the present invention integrates electrical starting and generating capabilities into existing structures of a gas turbine engine. In particular, an electrical machine is embedded into a compressor of the gas turbine engine, and an electrical system interface module distributes electrical power to and from the embedded electrical machine for starting the gas turbine engine and for operating gas turbine engine accessories. Thus, the present invention enables design and operation of a gas turbine engine, and associated accessories, without a radial power-takeoff shaftline or an accessory gearbox. The present invention thereby permits reducing the overall length of the gas turbine engine, leading to a symmetrical and/or smaller nacelle that exhibits reduced drag and lower specific fuel consumption. The present invention also permits dispersed arrangement of accessory devices to enhance reliability and to ease maintenance of the gas turbine engine system. Additionally, the electrical system interface module provides a turnkey/plug-and-play solution for prime power generation and/or propulsion needs.

Also, the present invention mounts permanent-magnet field magnets within an interstage spacer, a blade root region, or modified blades of the compressor assembly, thereby employing the existing rotor structure to support the field magnets and substantially eliminating structural loads on the field magnets. By eliminating structural loads on the field magnets, the present invention enhances positioning of the field magnets to optimize electromagnetic coupling without significantly impacting structural requirements.

While the invention has been described with reference to preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A gas turbine engine having a casing, a shaft rotatably mounted in the casing, and a compressor rotor and a turbine rotor mounted to the shaft within the casing, the engine comprising:
   a field magnet mounted within an interstage spacer of the compressor rotor, the interstage spacer connecting a first compressor disc blade root region to an adjacent second compressor disc blade root region;
   a circumferential array of conductive coils mounted in the casing substantially adjacent to a circle defined by revolution of the field magnet within the casing; and
   an electrical system interface module electrically connected to the circumferential array of conductive coils.

2. The gas turbine engine according to claim 1, wherein the electrical system interface module includes a starter module for providing electrical current to the conductive coils, a power-takeoff module for receiving current from the conductive coils, and a control module for actuating one of the starter module and the power-takeoff module based on at least a command signal.

3. The gas turbine engine according to claim 2, wherein the conductive coils are individually connected to outputs of the starter module, the starter module is configured to provide pulsed DC to each of the conductive coils in a predetermined sequence for operating the gas turbine engine as a motor, and the power-takeoff module is configured to receive pulsed DC from each of the conductive coils for operating the gas turbine engine as an electrical generator.

4. The gas turbine engine according to claim 2, wherein the control module is connected to sense an electrical parameter associated with at least one of the conductive coils.

5. A gas turbine engine having a casing, a shaft rotatably mounted in the casing, and a compressor rotor and a turbine rotor mounted to the shaft within the casing, the engine comprising:
   a field magnet mounted within an interstage spacer of the compressor rotor, the interstage spacer connecting a first compressor disc blade root region to an adjacent second compressor disc blade root region; and a circumferential array of conductive coils, each coil mounted within a respective guide vane of the casing substantially adjacent to a circle defined by revolution of the field magnet within the casing, wherein each coil of the circumferential array of conductive coils is connected with power bus conductors via leads extending radially outward through the guide vane.

6. The gas turbine engine as claimed in claim 5, wherein each coil of the circumferential array of conductive coils extends about and along a radial axis within its respective guide vane.

7. A gas turbine engine having a casing, a shaft rotatably mounted in the casing, and a compressor rotor and a turbine rotor mounted to the shaft within the casing, the engine comprising:

a field magnet mounted in the compressor rotor;

a circumferential array of conductive coils mounted in the casing substantially adjacent to a circle defined by revolution of the field magnet within the casing;

an electrical system interface module electrically connected to the circumferential array of conductive coils;

additional magnets arranged on the compressor rotor to form a circumferential array of magnets including the field magnet; and a peripheral passage formed in the compressor rotor adjacent to at least one magnet of the circumferential array of magnets for providing coolant flow to the magnet or magnets adjacent to the peripheral passage, the peripheral passage defined by a perforated interstage spacer connecting a first perforated compressor disc blade root region to an adjacent second perforated compressor disc blade root region.

8. The gas turbine engine according to claim 7, wherein the compressor rotor includes a circumferential array of peripheral passages, each passage being formed adjacent to one of the circumferential array of magnets for providing coolant flow to each of the magnets.

9. The gas turbine engine according to claim 7, wherein the coolant flow is air drawn from the gas turbine engine inlet by an opening disposed within the compressor rotor.

10. The gas turbine engine according to claim 7, wherein the coolant flow is pumped oil or secondary air flow through the peripheral passage.

* * * * *